US009037882B2

(12) United States Patent
Vadakkanmaruveedu et al.

(10) Patent No.: US 9,037,882 B2
(45) Date of Patent: May 19, 2015

(54) SYSTEM AND METHOD FOR THERMAL MANAGEMENT IN A PORTABLE COMPUTING DEVICE USING THERMAL RESISTANCE VALUES TO PREDICT OPTIMUM POWER LEVELS

(71) Applicant: QUALCOMM INCORPORATED, San Diego, CA (US)

(72) Inventors: Unnikrishnan Vadakkanmaruveedu, Phoenix, AZ (US); Paras S. Doshi, San Diego, CA (US); Ankur Jain, San Diego, CA (US); Vinay Mitter, San Diego, CA (US); Richard A. Stewart, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 263 days.

(21) Appl. No.: 13/779,153

(22) Filed: Feb. 27, 2013

(65) Prior Publication Data
US 2014/0245032 A1 Aug. 28, 2014

(51) Int. Cl.
*G06F 1/00* (2006.01)
*G06F 1/26* (2006.01)
*G06F 1/20* (2006.01)
*G06F 1/32* (2006.01)

(52) U.S. Cl.
CPC *G06F 1/26* (2013.01); *G06F 1/203* (2013.01); *G06F 1/206* (2013.01); *G06F 1/3296* (2013.01); *Y02B 60/1275* (2013.01)

(58) Field of Classification Search
CPC .................................................. G06F 1/206
USPC ....................................................... 713/300
See application file for complete search history.

(56) References Cited

U.S. PATENT DOCUMENTS

| | | | |
|---|---|---|---|
| 5,805,403 A | 9/1998 | Chemla | |
| 7,076,672 B2 | 7/2006 | Naveh et al. | |
| 7,111,178 B2 | 9/2006 | Rusu et al. | |
| 7,275,012 B2 * | 9/2007 | Hermerding, II | 713/300 |
| 7,461,272 B2 * | 12/2008 | Rotem et al. | 713/300 |
| 7,887,235 B2 | 2/2011 | Campos et al. | |
| 8,182,139 B2 | 5/2012 | Fiennes et al. | |

(Continued)

OTHER PUBLICATIONS

International Search Report and Written Opinion—PCT/US2014/018774—ISA/EPO—Jun. 17, 2014.

(Continued)

*Primary Examiner* — Jaweed A Abbaszadeh
*Assistant Examiner* — Xuxing Chen
(74) *Attorney, Agent, or Firm* — Smith Risley Tempel Santos LLC (57) ABSTRACT

Various embodiments of methods and systems for thermal energy management in a portable computing device ("PCD") based on power level calculations are disclosed. An exemplary method includes tracking instantaneous operating temperatures and active power supply levels to one or more components. With an estimate or measurement of ambient temperature, the instantaneous operating temperature values and active power supply level values can be used to calculate an instantaneous thermal resistance value. In the event that thermal energy generation should be managed, a target operating temperature may be used with the ambient temperature and the instantaneous thermal resistance value to solve for an optimum power supply level. The active power supply level may then be adjusted based on the calculated optimum power supply level.

40 Claims, 6 Drawing Sheets

(56) References Cited

U.S. PATENT DOCUMENTS

| | | | |
|---|---|---|---|
| 2008/0028778 A1 | 2/2008 | Millet | |
| 2010/0235012 A1* | 9/2010 | Cox et al. | 700/299 |
| 2012/0179303 A1 | 7/2012 | Anderson et al. | |
| 2013/0226364 A1* | 8/2013 | Artman et al. | 700/300 |

OTHER PUBLICATIONS

Shang L., et al., "Temperature-Aware On-Chip Networks", May 10, 2006, pp. 130-139, XP055121611, Retrieved from the Internet: URL:http://projects.csail.mit.edu/wiki/pub/LSPgroup/PublicationList/thermalherd_toppicks.pdf[retrieved on Jun. 4, 2014].

Zhu C., et al., "Three-Dimensional Chip-Multiprocessor Run-Time Thermal Management," IEEE Transactions on Computer Aided Design of Integrated Circuits and Systems, Aug. 2008, vol. 27 (8), pp. 1479-1492.

\* cited by examiner

SYSTEM AND METHOD FOR THERMAL MANAGEMENT IN A PORTABLE COMPUTING DEVICE USING THERMAL RESISTANCE VALUES TO PREDICT OPTIMUM POWER LEVELS

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned proximally to one another. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there usually isn't enough space within a PCD for engineers and designers to mitigate thermal degradation or failure of processing components by using clever spatial arrangements or strategic placement of passive cooling components. Therefore, current systems and methods rely on various temperature sensors embedded on the PCD chip to monitor the dissipation of thermal energy and then use the measurements to trigger application of thermal management techniques that adjust workload allocations, processing speeds, etc. to reduce thermal energy generation.

For example, some systems and methods may monitor temperature sensors to recognize that thermal thresholds have been exceeded before dynamically scaling voltage and/or frequency ("DVFS") settings in order to "dial back" power consumption of cores to reduce thermal energy generation. Notably, embodiments of the existing solutions may reduce power levels to cores one bin at a time or may rely on the recognition of use cases to jump down multiple bins at a time in an effort to more quickly stabilize thermal energy generation. Regardless, after adjusting a power level, the temperature sensors are queried again to determine if the previous power level adjustments produced the hoped-for reduction in thermal energy generation. If not, more adjustments are made and the loop continues until thermal energy levels are acceptable.

These existing solutions may be considered "closed loop" solutions because they monitor temperature sensors, make power setting adjustments, monitor temperature sensors again, make more power setting adjustments and then continue in the "closed loop" of adjustments and feedback until thermal energy generation is adequately mitigated. In this way, the existing closed loop solutions represent reactive approaches to thermal energy mitigation that may be relatively slow to arrive at an optimum power setting for mitigating thermal energy generation under ongoing conditions. Therefore, what is needed in the art is a system and method that proactively determines an optimum power setting for mitigating thermal energy generation when a thermal threshold is exceeded, thereby reducing or eliminating the need for additional power level adjustments. More specifically, what is needed in the art is a system and method for managing thermal energy generation in a PCD that calculates optimum power settings based on a tracked thermal resistance value.

SUMMARY OF THE DISCLOSURE

Various embodiments of methods and systems for thermal energy management in a portable computing device ("PCD") based on power level calculations are disclosed. Notably, in many PCDs, temperature thresholds associated with various components in the PCD such as, but not limited to, die junction temperatures and package on package ("PoP") memory temperatures limits the extent to which the performance capabilities of the PCD can be exploited. When operating temperatures approach or exceed certain predefined temperature thresholds, thermal mitigation measures must be taken to manage thermal energy generation and optimize QoS.

An exemplary method for managing thermal energy generation in a PCD includes defining temperature thresholds associated with one or more components in the PCD. Subsequently, temperature sensors associated with the one or more components are monitored. Temperature measurements taken by the temperature sensors may be indicative of instantaneous operating temperatures and are tracked in association with the components. Concurrently with tracking the instantaneous operating temperatures, the active power levels supplied to the components are also tracked. The instantaneous operating temperatures and active power levels being supplied can be used to calculate an instantaneous thermal resistance value for the components:

$$R_{INST} = (T_{INST} - T_A)/P_{SUPP}$$

Where:
$R_{INST}$ is the real-time or instantaneous thermal resistance;
$T_{INST}$ is the real-time or instantaneous operating temperature;
$T_A$ is the ambient temperature to which the PCD is exposed and may be an estimated value or may be a measured value; and
$P_{SUPP}$ is the active power being supplied to the core.

The instantaneous thermal resistance value is tracked. Subsequently, in the event that a temperature threshold is met, an adjusted power supply level may be calculated using the instantaneous $R_{INST}$ value and a target operating temperature in place of the $T_{INST}$ value in the above equation. The adjusted power supply calculation may then be used to determine the necessary amount of voltage and/or frequency scaling required to keep the component within acceptable thermal bounds.

Notably, embodiments of the above systems and methods may be used to mitigate thermal energy generation by reducing power supply levels in response to an elevated temperature measurement or, alternatively, may be used to authorize an increase in power supply levels (and, thus, an increase in thermal energy generation) in response to the recognition that additional thermal headroom is available.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "thermal aggressor" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD that consumes various levels of power to operate at various levels of functional efficiency, one of ordinary skill in the art will recognize that the use of these terms does not limit the application of the disclosed embodiments, or their equivalents, to the context of processing components within a PCD. That is, although many of the embodiments are described in the context of a processing component, it is envisioned that thermal management policies according to embodiments of the systems and methods may be applied to any functional component within a PCD including, but not limited to, a modem, a camera, a wireless network interface controller ("WNIC"), a display, a video encoder, a peripheral device, a battery, etc.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processor, one of ordinary skill in the art will acknowledge that use of these "thermal" terms in the present disclosure may be related to process load distributions, workload burdens and power consumption.

In this description, the terms "thermal mitigation technique(s)," "thermal policies," "thermal management," "thermal mitigation measure(s)," "throttling to a performance level" and the like are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Efficient management of thermal energy generation in a PCD can be accomplished by using one or more sensor measurements that correlate with the temperatures of silicon junctions in core(s) in combination with an instantaneous thermal resistance value of the core(s). Notably, although exemplary embodiments of the systems and methods are described herein in the context of temperature measurements associated with silicon junctions of cores, it will be understood that alternative embodiments may use temperature measurements and thermal resistance values associated with other components in a PCD. That is, although exemplary embodiments of thermal management methods that use predicted power level settings are described herein in the context of cores within a central processing unit ("CPU"), application of such thermal management methodologies are not limited to cores within a CPU. It is envisioned that embodiments of thermal management methods that use predicted power level settings may be extended to any component that may reside within a system on a chip ("SoC") and be operable at multiple performance levels such as, but not limited to, a graphical processing unit ("GPU"), a modem processor, a camera, etc. Further, it is envisioned that a thermal management algorithm that predicts optimum power level settings from instantaneous thermal resistance values may be leveraged individually on any component within a SoC that may be operated at multiple performance levels.

In an exemplary embodiment, a maximum operating temperature ("$T_{MAX}$") for silicon junctions of a core are empirically determined and then used to define a temperature threshold against which power levels for the core may be controlled. As one of ordinary skill in the art would understand, exposure of the junctions to operating temperatures in excess of a maximum operating temperature may cause damage to, or outright failure of, a processing component such as a core. As such, when it is recognized that operating temperatures associated with an exemplary core are nearing a maximum operating temperature or other such thermal threshold, thermal mitigation solutions may be employed to reduce the amount of thermal energy that is being generated by the core and/or other thermally aggressive components physically near the core.

Returning to the exemplary application, in operation the junction temperatures of the exemplary core may be monitored and compared against a temperature threshold associated with a $T_{MAX}$ value. Concurrently with monitoring the junction temperatures, the thermal resistance value of the core may also be tracked, where real-time or instantaneous thermal resistance ($R_{INST}$) may be calculated:

$$R_{INST}=(T_{INST}-T_A)/P_{SUPP} \quad (1)$$

Where:

$T_{INST}$ is the real-time or instantaneous junction temperature of a core;

$T_A$ is the ambient temperature to which the PCD is exposed and may be an estimated value or may be a measured value; and $P_{SUPP}$ is the active power being supplied to the core (may be, but is not limited to being, an instantaneous power level, a weighted average power level, a moving average power level, etc.).

If $T_{INST}$ exceeds a threshold associated with $T_{MAX}$ or other thermal threshold, thermal mitigation may be necessary. Notably, because the temperature of the exemplary core ("$T_{INST}$") correlates with the leakage power ("$P_L$") of the core, thermal energy generated by the core may be mitigated by adjusting the power being supplied to the core ("$P_{SUPP}$"), where $P_{SUPP}$ is equal to the sum of the leakage power ("$P_L$") and the active power ("$P_A$") being consumed by the core:

$$P_{SUPP}=P_A+P_L \quad (2)$$

Advantageously, embodiments of the systems and methods may calculate a new $P_{SUPP}$ level, i.e. an optimum $P_{SUPP}$ for reducing thermal energy generation, by solving for $P_{SUPP}$ per equation (1) above. Notably, because the values for $R_{INST}$, $T_{INST}$ and $T_A$ are known at the time the temperature threshold is exceeded, the systems and methods may substitute a desired temperature value for $T_{INST}$ in equation (1) and solve for a new $P_{SUPP}$ that would cause the $T_{INST}$ to reduce to the desired level.

Based on the new $P_{SUPP}$ determination, a targeted adjustment of voltage and/or frequency settings may be implemented to reduce the power supply to the optimum level for mitigating thermal energy generation. Advantageously, because the optimum power level is calculated based on the real-time conditions, it is envisioned that the iterative process of making incremental power adjustments based on temperature measurements may be reduced or eliminated to a point that provides for a quicker thermal stabilization of the PCD.

Although the illustrations in this disclosure primarily describe using the systems and methods to determine optimum power level for reducing thermal energy generation when a given temperature threshold is exceeded, the various embodiments and their equivalents are not limited to applications for reducing thermal energy generation. That is, it is envisioned that certain embodiments may recognize available headroom for an increase in thermal energy generation and, in response to that recognition, determine an optimum power level based on instantaneous thermal resistance that provides for an increase in workload processing. Advantageously, embodiments that recognize available thermal headroom and determine a new $P_{SUPP}$ based on an increased $T_{INST}$ may optimize the quality of service ("QoS") provided to a user of a PCD.

As one of ordinary skill in the art would recognize, in response to a determination of an optimum power level setting based on the real-time thermal resistance value a system and method for thermal management by power level prediction may leverage means for throttling a core down or up, as the case may warrant, to the optimum performance level. As more specifically described below, throttling strategies are various methods, applications and/or algorithms that may be employed by the PCD to increase or decrease its performance through adjustment of hardware and/or software parameters, such as the clock speed of a central processing unit ("CPU") or the like. Certain throttling strategies may increase performance of a PCD at the expense of increased thermal energy generation; however, certain other throttling strategies may mitigate a detrimental rise in operating temperature by reducing PCD performance. An exemplary throttling method that may be leveraged by a thermal management policy is a dynamic voltage and frequency scaling ("DVFS") method, described in more detail relative to FIG. 5.

Figure 1:
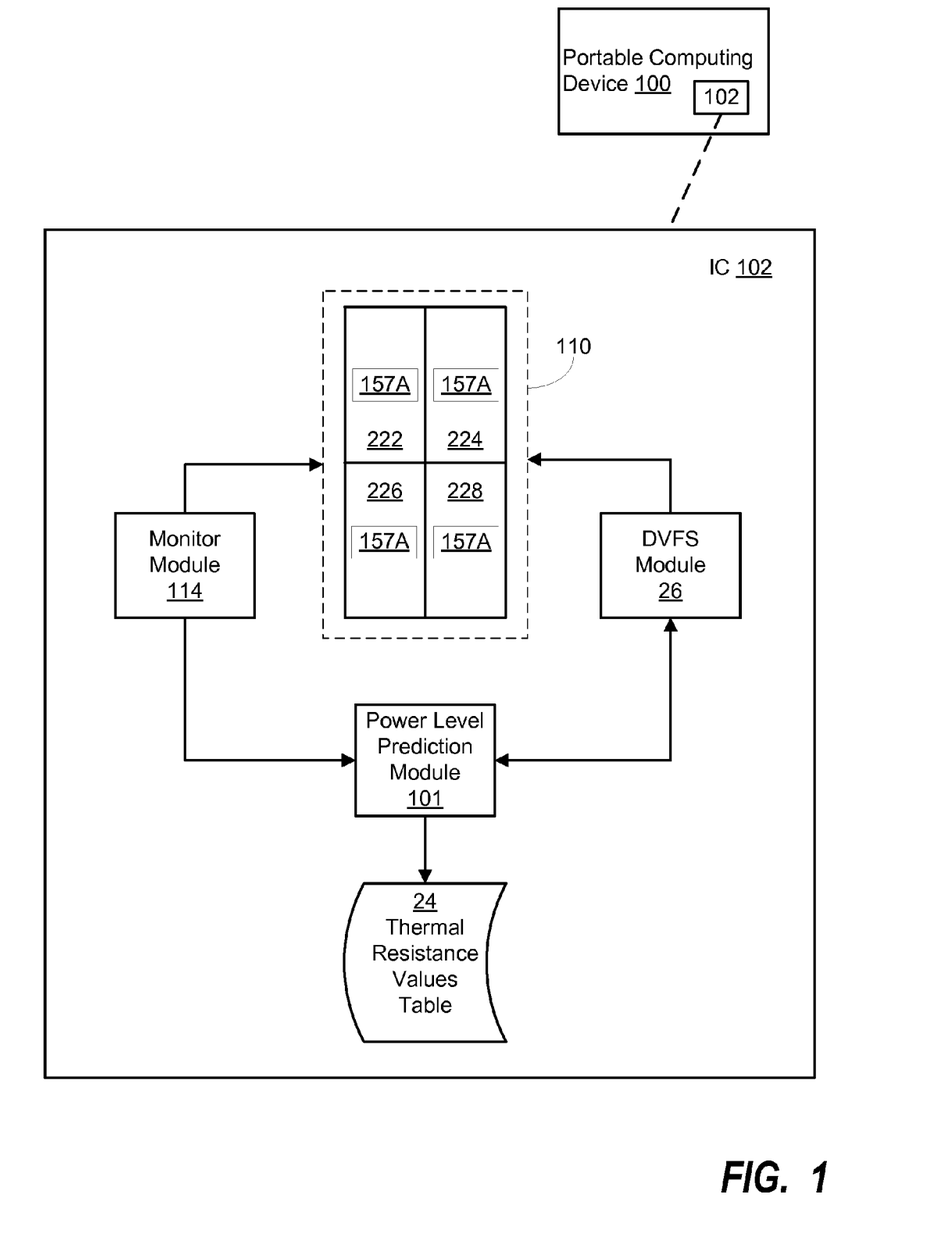
FIG. 1 is a functional block diagram illustrating an embodiment of an on-chip system for implementing in a portable computing device ("PCD") thermal management methodologies that use thermal resistance values to predict optimum power level settings.

FIG. 1 is a functional block diagram illustrating an embodiment of an on-chip system 102 for implementing in a portable computing device ("PCD") 100 thermal management methodologies that use thermal resistance values to predict optimum power level settings. To set temperature thresholds for triggering application of the embodiments in which a processing component, such as CPU 110, is throttled off its present performance level in an effort to manage thermal energy generation, the on-chip system 102 may leverage various sensors 157 for measuring temperatures associated with various components such as cores 222, 224, 226, 228. Advantageously, by monitoring the temperatures associated with the various components and adjusting the power supply levels to thermal aggressors 222, 224, 226, 228, the QoS experienced by a user of the PCD 100 may be optimized while avoiding thermal degradation of junctions or other aspects.

In general, the system employs three main modules which, in some embodiments, may be contained in a pair of modules or a single module: (1) a monitor module 114 for polling temperature sensors 157 and monitoring power supply levels to the cores 222, 224, 226, 228; (2) a power level prediction ("PLP") module 101 for analyzing temperature readings and power supply levels provided by the monitor module 114, calculating and tracking the instantaneous thermal resistance values of the cores 222, 224, 226, 228, and determining optimum power level settings for the cores 222, 224, 226, 228 based on targeted operating temperatures; and (3) a DVFS module 26 for implementing power level adjustments on individual processing components according to instructions received from PLP module 101. Advantageously, embodiments of the system and method that include the three main modules leverage temperature data and real-time thermal resistance values to optimize the power level authorized for components 110 within the PCD 100 without risking thermal degradation to other components within the PCD 100 or exceeding critical temperature thresholds.

In operation, an embodiment of the systems and methods may periodically poll the sensors 157A, which may be associated with silicon junctions of cores 222, 224, 226, 228, and provide the polled temperature data to the PLP module 101. The monitor module 114 may also monitor the power levels being supplied to the cores 222, 224, 226, 228 and provide that data to PLP module 101 as well. Based on the instantaneous temperature data and the active power supply level data, the PLP module 101 may calculate a thermal resistance value according to the formulas provided and explained above. The PLP module 101 may store, either permanently or temporarily, the thermal resistance values in a thermal resistance values ("TRV") table 24.

In the event that the monitor module 114 recognizes that a temperature threshold associated with one or more of the cores 222, 224, 226, 228 has been met or exceeded, the PLP 101 may be alerted. Advantageously, the PLP module 101 may be triggered to calculate a new power level setting based on a target operating temperature that is within the limits delineated by the temperature threshold, according to the formulas provided and explained above. The new power level settings may be supplied to the DVFS module 26 and voltage and/or frequency settings adjusted based on the new power level setting. By adjusting the DVFS settings in this manner, embodiments of the systems and methods may be able to avoid or reduce the need for iterative DVFS adjustments in search of a power supply level that satisfactorily mitigates thermal energy generation.

Again, as previously envisioned, certain embodiments may recognize the instantaneous temperature levels are below a maximum threshold, thereby indicating available thermal headroom. Such embodiments may be triggered to calculate new power level settings that increase thermal energy generation and provide improved QoS without causing risking thermal degradation of processing components or other components.

Figure 2:
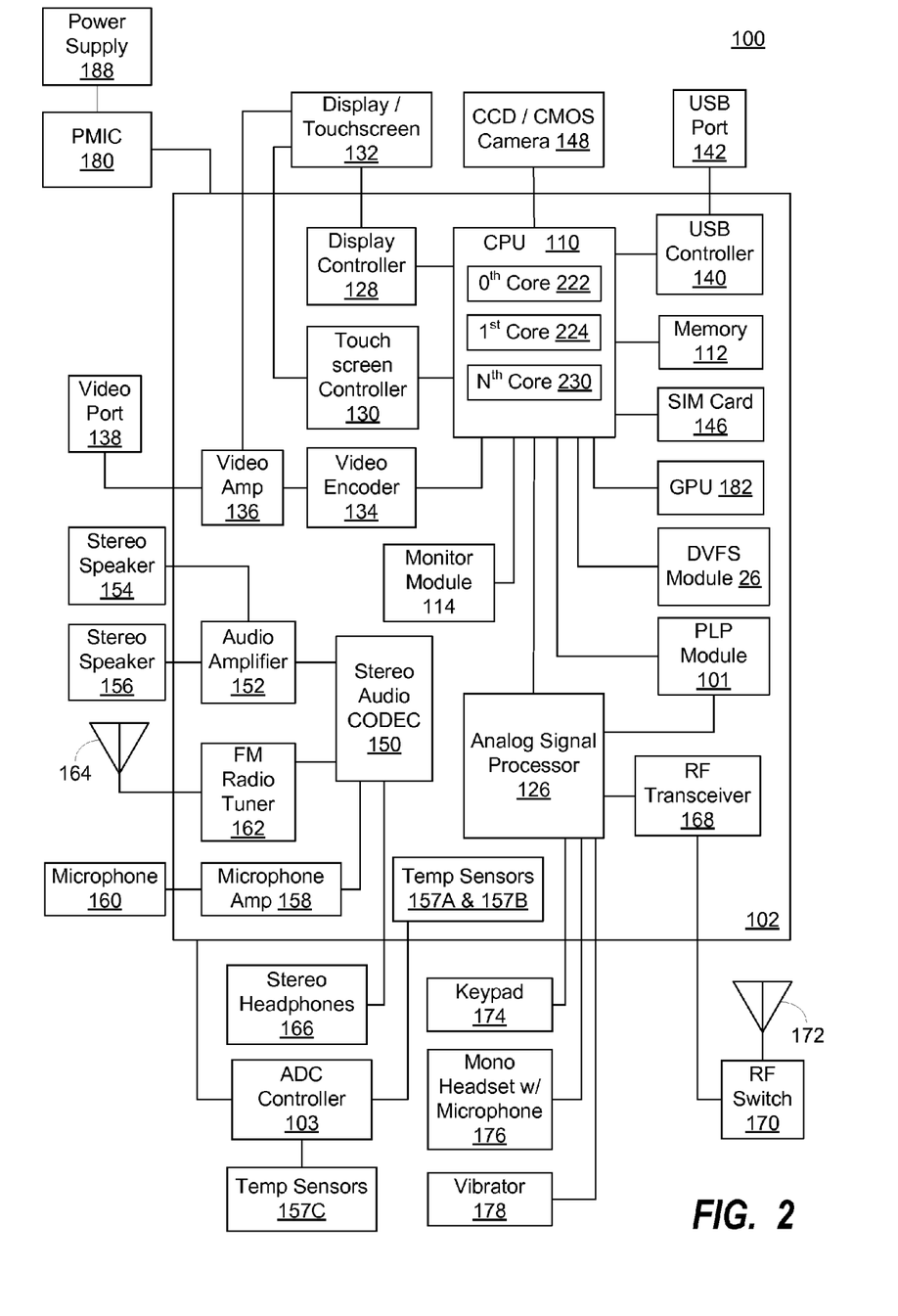
FIG. 2 is a functional block diagram illustrating an exemplary, non-limiting aspect of the PCD of FIG. 1 in the form of a wireless telephone for implementing methods and systems for thermal management using thermal resistance values to predict optimum power level settings.

FIG. 2 is a functional block diagram illustrating an exemplary, non-limiting aspect of the PCD 100 in the form of a wireless telephone for implementing methods and systems for thermal management using thermal resistance values to predict optimum power level settings. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the dynamic voltage and frequency scaling ("DVFS") module 26 may be responsible for implementing throttling techniques to individual processing components, such as cores 222, 224, 230 to help a PCD 100 optimize its power level and maintain a high level of functionality without detrimentally exceeding certain temperature thresholds.

The monitor module 114 communicates with multiple operational sensors (e.g., thermal sensors 157A, 157B) distributed throughout the on-chip system 102 and with the CPU 110 of the PCD 100 as well as with the PLP module 101. In some embodiments, monitor module 114 may also monitor skin temperature sensors 157C for temperature readings associated with a touch temperature of PCD 100 and/or an ambient temperature ("$T_A$") to which PCD 100 is exposed. In other embodiments, monitor module 114 may infer touch temperatures or ambient temperatures based on a likely delta with readings taken by on chip temperature sensors 157A, 157B. The PLP module 101 may work with the monitor module 114 to identify temperature thresholds that have been exceeded and instruct the application of throttling strategies to identified components within chip 102 in an effort to reduce the temperatures or, in other scenarios, allow for an increase in the temperatures.

As illustrated in FIG. 2, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 through power management integrated circuit ("PMIC") 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157B, 157C may be employed without departing from the scope of the invention.

The DVFS module(s) 26 and PLP module(s) 101 may comprise software which is executed by the CPU 110. However, the DVFS module(s) 26 and PLP module(s) 101 may also be formed from hardware and/or firmware without departing from the scope of the invention. The PLP module(s) 101 in conjunction with the DVFS module(s) 26 may be responsible for applying throttling policies that may help a PCD 100 avoid thermal degradation while maintaining a high level of functionality and user experience.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100. For example, the monitor module 114 may receive active power supply level indications from PMIC 180 and supply those indications to the PLP module 101.

In a particular aspect, one or more of the method steps described herein may be implemented by executable instructions and parameters stored in the memory 112 that form the one or more PLP module(s) 101 and DVFS module(s) 26. These instructions that form the module(s) 101, 26 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 3A:
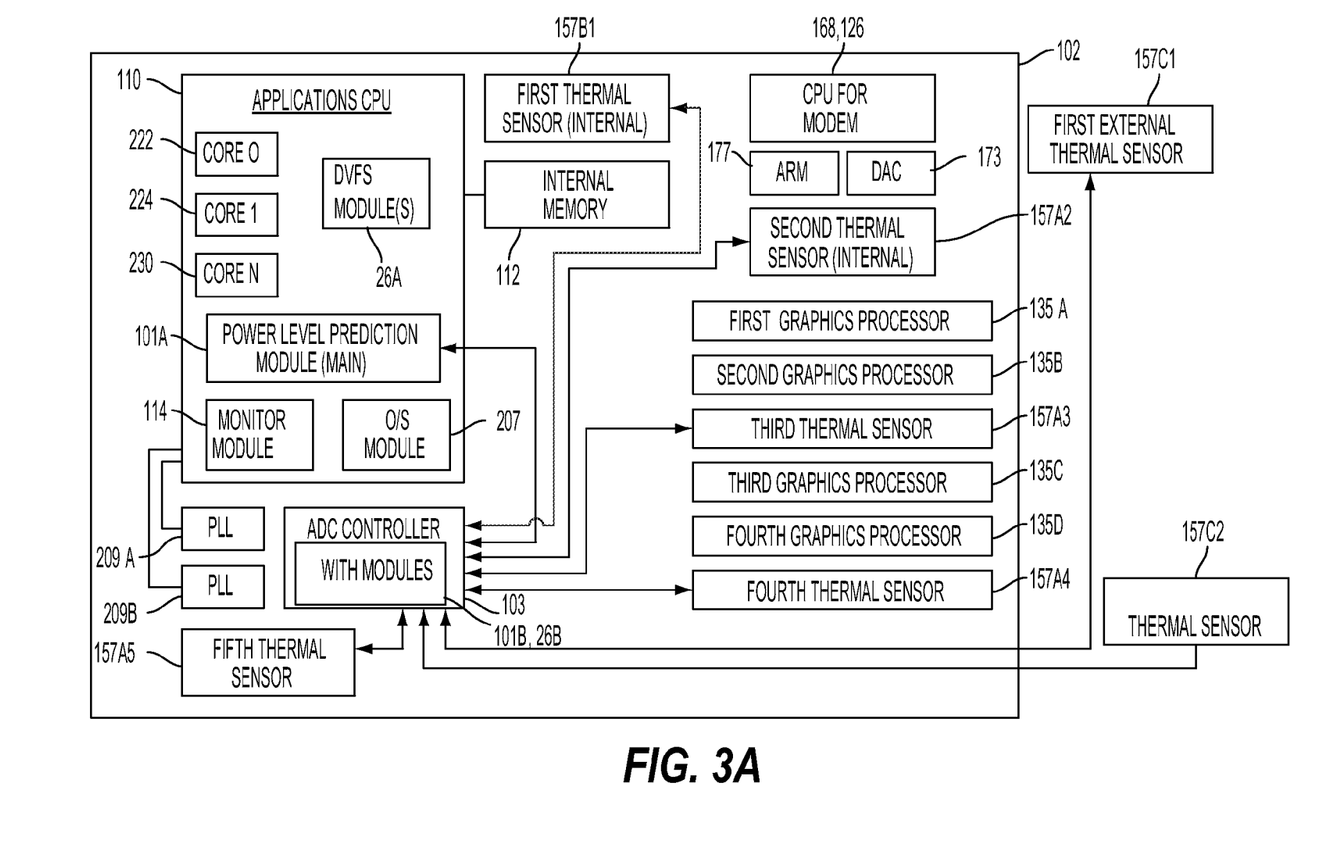
FIG. 3A is a functional block diagram illustrating an exemplary spatial arrangement of hardware for the chip illustrated in FIG. 2.

FIG. 3A is a functional block diagram illustrating an exemplary spatial arrangement of hardware for the chip 102 illustrated in FIG. 2. According to this exemplary embodiment, the applications CPU 110 is positioned on the far left side region of the chip 102 while the modem CPU 168, 126 is positioned on a far right side region of the chip 102. The applications CPU 110 may comprise a multi-core processor that includes a zeroth core 222, a first core 224, and an Nth core 230. The applications CPU 110 may be executing a PLP module 101A and/or DVFS module 26A (when embodied in software) or it may include a PLP module 101A and/or DVFS module 26A (when embodied in hardware). The application CPU 110 is further illustrated to include operating system ("O/S") module 207 and a monitor module 114. Further details about the monitor module 114 will be described below in connection with FIG. 3B.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own PLP module 101B and/or DVFS module 26B that works in conjunction with the main modules 101A, 26A of the applications CPU 110.

The PLP module 101B of the ADC controller 103 may be responsible for monitoring and tracking multiple thermal sensors 157 that may be provided "on-chip" 102 and "off-chip" 102. The on-chip or internal thermal sensors 157A, 157B may be positioned at various locations and associated with thermal aggressor(s) proximal to the locations (such as with sensor 157A3 next to second and third thermal graphics processors 135B and 135C) or temperature sensitive components (such as with sensor 157B1 next to memory 112).

As a non-limiting example, a first internal thermal sensor 157B1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157C may also be coupled to the ADC controller 103. The first external thermal sensor 157C1 may be positioned off-chip and adjacent to a top right quadrant of the chip 102 that may include the modem CPU 168, 126, the ARM 177, and DAC 173. A second external thermal sensor 157C2 may be positioned off-chip and adjacent to a lower right quadrant of the chip 102 that may include the third and fourth graphics processors 135C, 135D. Notably, one or more of external thermal sensors 157C may be leveraged to indicate the touch temperature of the PCD 100, i.e. the temperature that may be experienced by a user in contact with the PCD 100, and/or the ambient temperature to which the PCD is exposed.

One of ordinary skill in the art will recognize that various other spatial arrangements of the hardware illustrated in FIG. 3A may be provided without departing from the scope of the invention. FIG. 3A illustrates yet one exemplary spatial arrangement and how the main PLP and DVFS modules 101A, 26A and ADC controller 103 with its PLP and DVFS modules 101B, 26B may recognize thermal conditions that are a function of the exemplary spatial arrangement illustrated in FIG. 3A, compare temperature thresholds with operating temperatures and/or touch temperatures and apply throttling policies driven by optimum power level settings determined from instantaneous thermal resistance values.

Figure 3B:
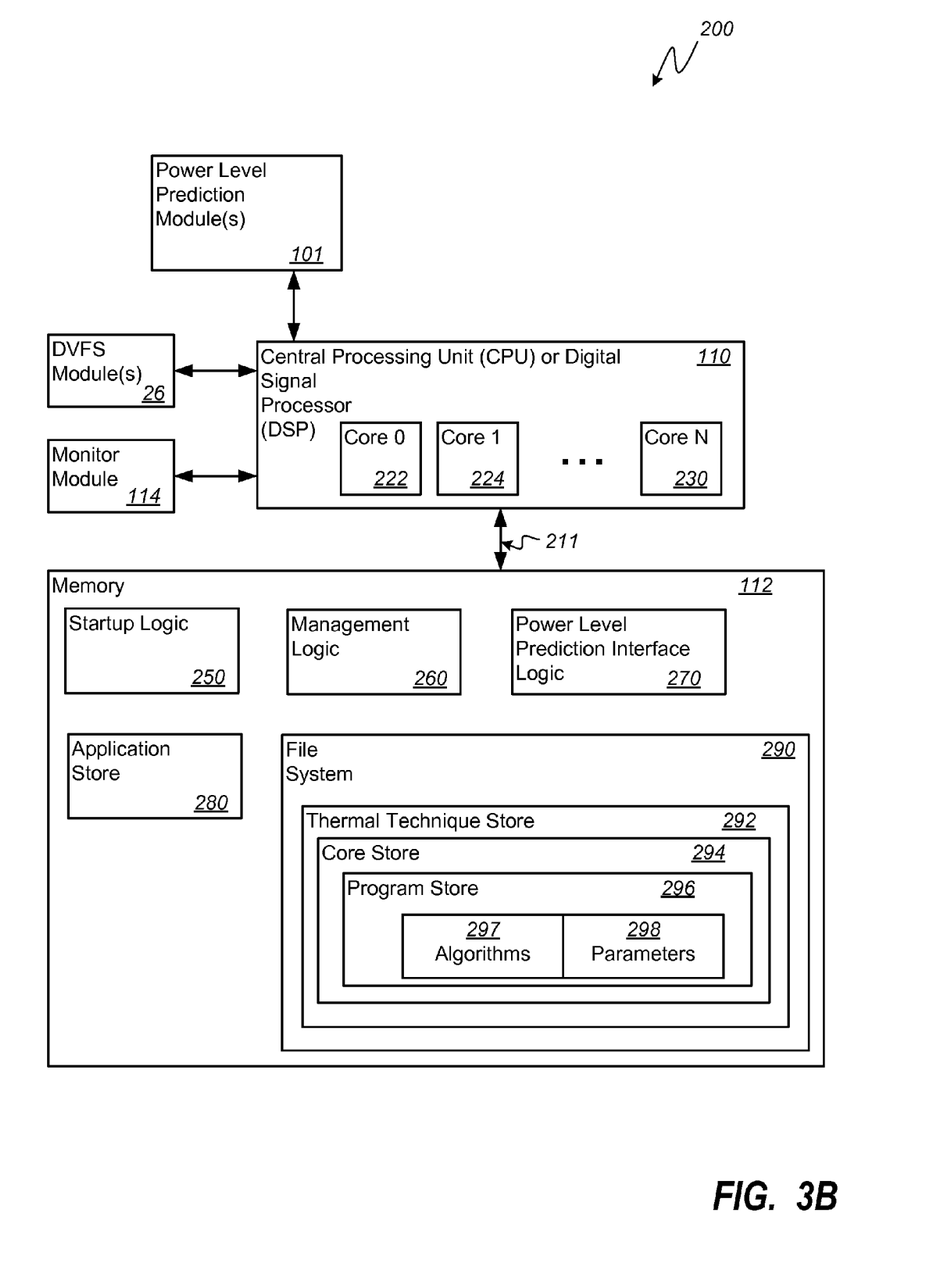
FIG. 3B is a schematic diagram illustrating an exemplary software architecture of the PCD of FIG. 2 for thermal management using thermal resistance values to predict optimum power level settings.

FIG. 3B is a schematic diagram illustrating an exemplary software architecture of the PCD 100 of FIG. 2 for thermal management using thermal resistance values to predict optimum power level settings. Any number of algorithms may form or be part of at least one thermal management policy that may be applied by the PLP module 101 when certain thermal conditions are met, however, in a preferred embodiment the PLP module 101 works with the DVFS module 26 to adjust voltage and frequency scaling policies to individual thermal aggressors in chip 102 including, but not limited to, cores 222, 224 and 230. The voltage and frequency scaling policies may be based on an optimum power level calculated from instantaneous thermal resistance values and targeted operating temperature levels. The PLP module 101 may be triggered to calculate the optimum power level when a temperature threshold associated with a silicon junction aspect of a core is met or exceeded.

As illustrated in FIG. 3B, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the PLP module(s) 101 and/or DVFS module(s) 26 that may comprise software and/or hardware. If embodied as software, the module(s) 101, 26 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 3B, it should be noted that one or more of startup logic 250, management logic 260, power level prediction interface logic 270, applications in application store 280 and portions of the file system 290 may be stored on any computer-readable medium for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the power level prediction interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for managing or controlling the performance of one or more of the available cores such as the first core 222, the second core 224 through to the $N^{th}$ core 230. The startup logic 250 may identify, load and execute a select program based on the comparison, by the PLP module 101, of various temperature measurements with threshold temperature settings associated with a PCD component or aspect. An exemplary select program can be found in the program store 296 of the embedded file system 290 and may be defined by a specific combination of a performance scaling algorithm 297 and a set of parameters 298. The exemplary select program, when executed by one or more of the core processors in the CPU 110 may operate in accordance with one or more signals provided by the monitor module 114 in combination with control signals provided by the one or more PLP module(s) 101 and DVFS module(s) 26 to scale the performance of the respective processor core "up" or "down" based on an optimum power level setting calculated by the PLP module(s) 101. In this regard, the monitor module 114 may provide one or more indicators of events, processes, applications, resource status conditions, elapsed time, as well as temperature as received from the PLP module 101.

The management logic 260 includes one or more executable instructions for terminating a thermal management program on one or more of the respective processor cores, as well as selectively identifying, loading, and executing a more suitable replacement program for managing or controlling the performance of one or more of the available cores. The management logic 260 is arranged to perform these functions at run time or while the PCD 100 is powered and in use by an operator of the device. A replacement program can be found in the program store 296 of the embedded file system 290 and, in some embodiments, may be defined by a specific combination of a performance scaling algorithm 297 and a set of parameters 298.

The replacement program, when executed by one or more of the core processors in the digital signal processor may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, etc in response to control signals originating from the PLP module 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal technique store 292. In this regard, the file system 290 may include a reserved section of its total file system capacity for the storage of information for the configuration and management of the various parameters 298 and thermal management algorithms 297 used by the PCD 100. As shown in FIG. 3B, the store 292 includes a core store 294, which includes a program store 296, which includes one or more thermal management programs.

Figure 4:
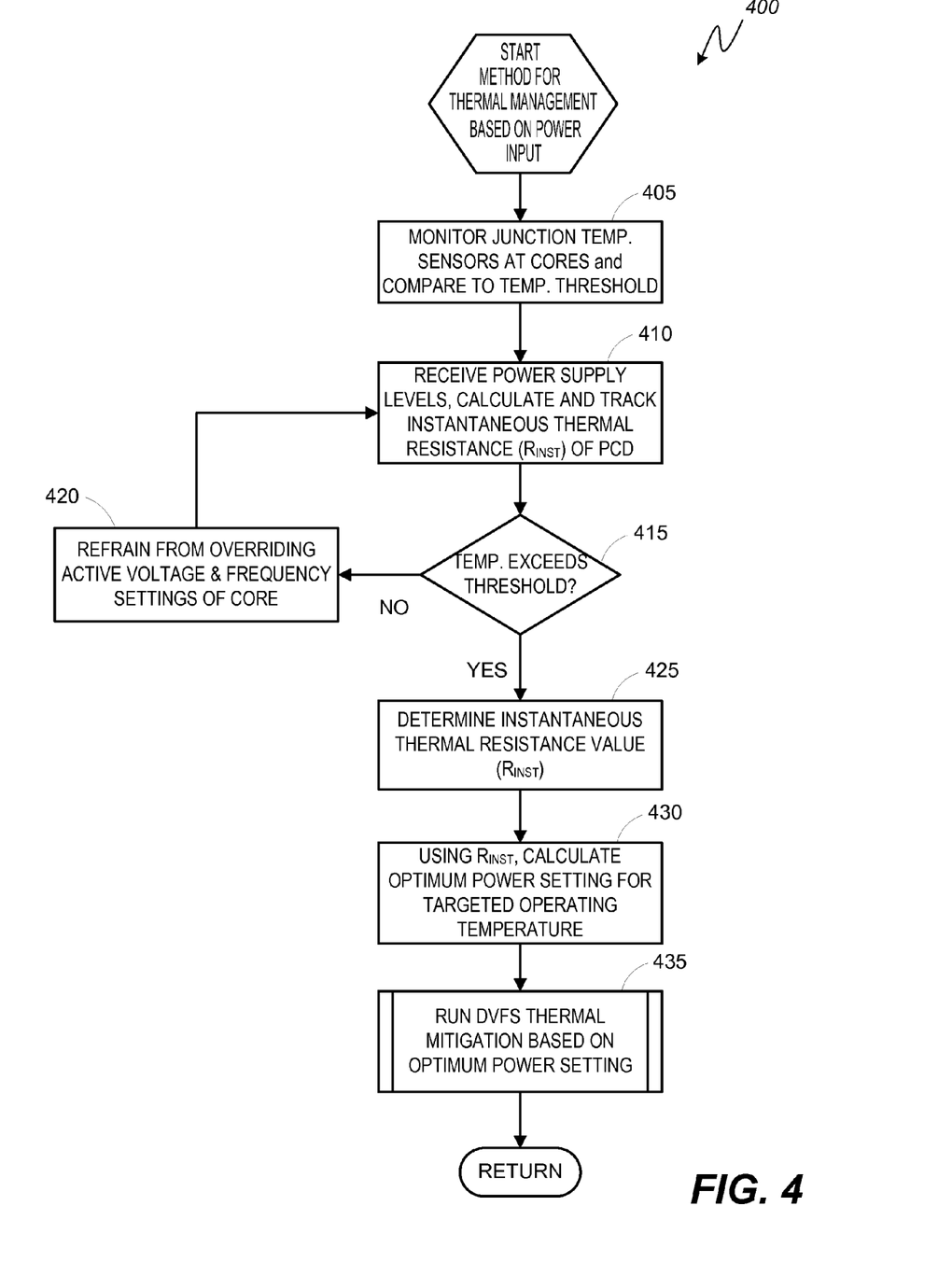
FIG. 4 is a logical flowchart illustrating a method for thermal management using thermal resistance values to predict optimum power level settings in the PCD of FIG. 1.

FIG. 4 is a logical flowchart illustrating a method for thermal management using thermal resistance values to predict optimum power level settings in a PCD 100. Method 400 of FIG. 4 starts with a first block 405 in which temperature sensors 157 reading junction temperatures of processing components, such as cores 222, 224, 226, 228, are polled by the monitor module 114. The temperature readings taken at block 405 may be compared against a temperature threshold to determine if an operating temperature has exceeded the threshold. The temperature readings, which represent instantaneous or real-time temperatures ("$T_{INST}$") associated with the exemplary processing components, may be provided to PLP module 101.

Concurrently with the actions of block 405, at block 410 the PLP module 101 may receive indications of the active power levels ("$P_{SUPP}$") being supplied to the exemplary processing components and, in combination with the $T_{INST}$ values and the ambient temperature ("$T_A$") to which the PCD 100 is exposed, calculate and track instantaneous or real-time values representative of a thermal resistance level ("$R_{INST}$") of the processing components. Notably, the tracking and monitoring of the $T_{INST}$ and $P_{SUPP}$ values, as well as the calculation and tracking of the $R_{INST}$ values, may be ongoing in certain embodiments.

Subsequently or concurrently, at decision block 415 it may be determined whether a $T_{INST}$ value meets or exceeds a temperature threshold such as, for example, a temperature threshold associated with a maximum temperature to which a silicon junction of a core may be exposed. If the $T_{INST}$ value does not exceed the threshold, the "no" branch may be followed to block 420 and the power level settings being supplied to the cores by the DVFS module 26 and/or PMIC 180 may be left unmodified or unadjusted. If the $T_{INST}$ value does exceed the threshold, it may be recognized that thermal mitigation measures should be taken and the "yes" branch is followed to block 425.

At blocks 425 and 430, the PLP module 101 may, based on the $R_{INST}$ value determined and tracked at block 410, the $T_A$ value and a target operating temperature in place of the $T_{INST}$, calculate an adjusted power level setting. At block 435, the PLP module 101 may provide the adjusted power level setting to the DVFS module 26 for modification of the voltage and/or frequency settings of the $P_{SUPP}$ based on the adjusted power level setting. Advantageously, by calculating the adjusted power level setting that would be necessary, given the instantaneous values of the $R_{INST}$ and $T_A$, to drive the $T_{INST}$ down to a targeted operating temperature within the boundaries defined by the temperature threshold, embodiments of the systems and methods may more efficiently adjust DVFS settings to manage thermal energy generation in a PCD 100.

Referring back to decision block 415, certain embodiments may recognize that a $T_{INST}$ value is well below a certain temperature threshold and thereby determine that additional capacity for thermal energy generation is available. In such a scenario, certain embodiments may conduct the actions of blocks 425-435 to adjust power settings of the cores upward, thereby providing increased processing speed and improved QoS.

Figure 5:
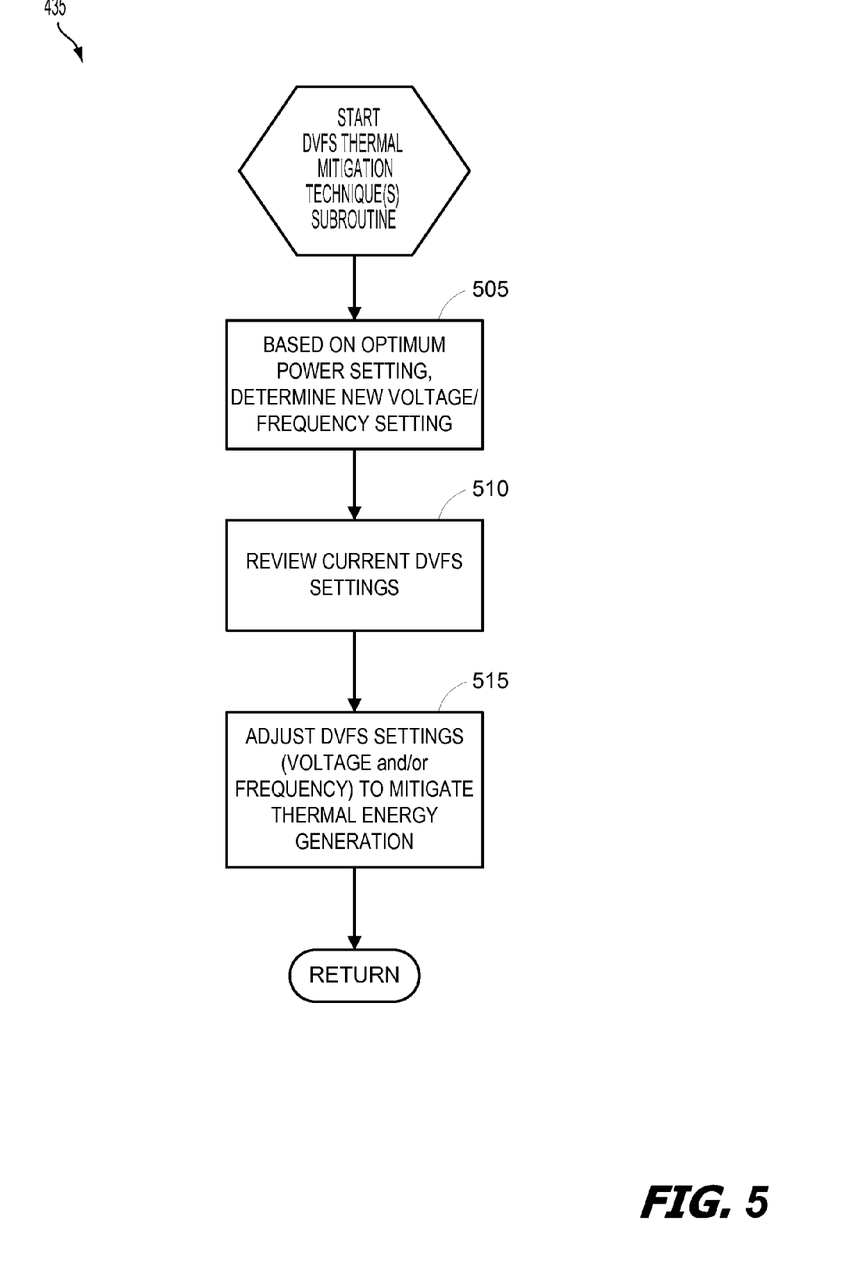
FIG. 5 is a logical flowchart illustrating sub-method or subroutines for applying dynamic voltage and frequency scaling ("DVFS") thermal mitigation techniques based on an optimum power level setting determined from a real-time thermal resistance value associated with a component in the PCD of FIG. 1.

FIG. 5 is a logical flowchart illustrating sub-method or subroutine 435 for applying dynamic voltage and frequency scaling ("DVFS") thermal management techniques. As described above, DVFS techniques may be leveraged by a PLP module 101 in the application of thermal management policies that determine optimum power supply levels based on instantaneous thermal resistance values. In certain embodiments, the DVFS throttling techniques may be applied to individual processing components such that an active power supply level is adjusted to an optimum level for management of thermal energy generation.

As understood by one of ordinary skill in the art, the demand for processors that provide high performance and low power consumption has led to the use of various power management techniques, such as, dynamic voltage and frequency scaling, sometimes referred to as dynamic voltage and current scaling ("DVCS"), in processor designs. DVFS enables trade-offs between power consumption and performance. Processors 110 and 126, for instance, may be designed to take advantage of DVFS by allowing the clock frequency of each processor to be adjusted with a corresponding adjustment in voltage.

A reduction in operating voltage usually results in a proportional savings in power consumed. One main issue for DVFS enabled processors 110, 126 is how to control the balance between performance and power savings.

Block 505 is the first step in the submethod or subroutine 435 for applying DVFS thermal mitigation techniques in a system or method that manages thermal energy generation through predicted power levels based on thermal resistance values. In this first block 505, the PLP module 101 may determine that a temperature threshold, such as a junction threshold, has been violated based on temperature readings provided by thermal sensors 157A through monitor module 114. Accordingly, the PLP module 101 may then calculate an adjusted power supply level that, given the instantaneous thermal resistance level $R_{INST}$, may drive the thermal energy generation to an acceptable level. The PLP module 101 may then initiate instructions to the DVFS module 26 to review the current DVFS settings in block 510 and adjust the DVFS settings at block 515 commensurate with the calculated adjusted power supply level.

At block 515, the DVFS module 26 may issue commands to adjust the current DVFS settings that may include voltage and/or frequency, in order to mitigate thermal loading conditions or, alternatively, allow for increased thermal generation. Adjusting the settings may comprise adjusting or "scaling" the maximum clock frequency allowed in DVFS algorithm. As described above, the DVFS module 26 may be dedicated to a processing component and adjust the power level to the processing component in accordance with the optimum power level provided by the PLP module 101. Notably, although the monitor module 114, PLP module 101 and DVFS module 26 have been described in the present disclosure as separate modules with separate functionality, it will be understood that in some embodiments the various modules, or aspects of the various modules, may be combined into a common module for implementing systems and methods for thermal management by power level prediction.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/ or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing thermal energy generation in a portable computing device ("PCD"), the method comprising:
   defining temperature thresholds associated with one or more components in the PCD;
   monitoring one or more temperature sensors in the PCD, wherein each temperature sensor is associated with one of the one or more components and generates signals that represent an instantaneous temperature;
   tracking an instantaneous thermal resistance value associated with each of the one or more components, wherein the instantaneous thermal resistance value of a component is calculated from the instantaneous temperature of the component, an active power supply to the component and an ambient temperature of the PCD;
   determining that a temperature threshold associated with at least one of the one or more components has been exceeded;
   calculating an adjusted power supply for the at least one of the one or more components, wherein the adjusted power supply is calculated from a target temperature of the at least one of the one or more components, the ambient temperature of the PCD and the instantaneous thermal resistance value associated with the at least one of the one or more components; and applying the adjusted power supply to the at least one of the one or more components.

2. The method of claim 1, wherein at least one of the one or more temperature sensors is associated with a silicon junction of a core.

3. The method of claim 1, wherein at least one of the one or more temperature sensors is associated with a package on package ("PoP") memory component.

4. The method of claim 1, wherein the target temperature is lower than the instantaneous temperature.

5. The method of claim 1, wherein the target temperature is higher than the instantaneous temperature.

6. The method of claim 1, wherein applying the adjusted power supply further comprises scaling the voltage and/or frequency of the active power supply.

7. The method of claim 6, wherein the adjusted power supply is lower than the active power supply.

8. The method of claim 6, wherein the adjusted power supply is higher than the active power supply.

9. The method of claim 1, wherein the PCD is in the form of a wireless telephone.

10. The method of claim 1, wherein thermal energy generated by processing components in the PCD cannot be managed with a fan component.

11. A computer system for managing thermal energy generation in a portable computing device ("PCD"), the system comprising:

a power level prediction module configured to:
monitor one or more temperature sensors in the PCD, wherein each temperature sensor is associated with one of the one or more components and generates signals that represent an instantaneous temperature;
track an instantaneous thermal resistance value associated with each of the one or more components, wherein the instantaneous thermal resistance value of a component is calculated from the instantaneous temperature of the component, an active power supply to the component and an ambient temperature of the PCD;
determine that a temperature threshold associated with at least one of the one or more components has been exceeded;
calculate an adjusted power supply for the at least one of the one or more components, wherein the adjusted power supply is calculated from a target temperature of the at least one of the one or more components, the ambient temperature of the PCD and the instantaneous thermal resistance value associated with the at least one of the one or more components; and
apply the adjusted power supply to the at least one of the one or more components.

12. The computer system of claim 11, wherein at least one of the one or more temperature sensors is associated with a silicon junction of a core.

13. The computer system of claim 11, wherein at least one of the one or more temperature sensors is associated with a package on package ("PoP") memory component.

14. The computer system of claim 11, wherein the target temperature is lower than the instantaneous temperature.

15. The computer system of claim 11, wherein the target temperature is higher than the instantaneous temperature.

16. The computer system of claim 11, wherein apply the adjusted power supply further comprises scaling the voltage and/or frequency of the active power supply.

17. The computer system of claim 16, wherein the adjusted power supply is lower than the active power supply.

18. The computer system of claim 16, wherein the adjusted power supply is higher than the active power supply.

19. The computer system of claim 11, wherein the PCD is in the form of a wireless telephone.

20. The computer system of claim 11, wherein thermal energy generated by processing components in the PCD cannot be managed with a fan component.

21. A computer system for managing thermal energy generation in a portable computing device ("PCD"), the system comprising:

means for monitoring one or more temperature sensors in the PCD, wherein each temperature sensor is associated with one of the one or more components and generates signals that represent an instantaneous temperature;
means for tracking an instantaneous thermal resistance value associated with each of the one or more components, wherein the instantaneous thermal resistance value of a component is calculated from the instantaneous temperature of the component, an active power supply to the component and an ambient temperature of the PCD;
means for determining that a temperature threshold associated with at least one of the one or more components has been exceeded;
means for calculating an adjusted power supply for the at least one of the one or more components, wherein the adjusted power supply is calculated from a target temperature of the at least one of the one or more components, the ambient temperature of the PCD and the instantaneous thermal resistance value associated with the at least one of the one or more components; and
means for applying the adjusted power supply to the at least one of the one or more components.

22. The computer system of claim 21, wherein at least one of the one or more temperature sensors is associated with a silicon junction of a core.

23. The computer system of claim 21, wherein at least one of the one or more temperature sensors is associated with a package on package ("PoP") memory component.

24. The computer system of claim 21, wherein the target temperature is lower than the instantaneous temperature.

25. The computer system of claim 21, wherein the target temperature is higher than the instantaneous temperature.

26. The computer system of claim 21, wherein the means for applying the adjusted power supply further comprises means for scaling the voltage and/or frequency of the active power supply.

27. The computer system of claim 26, wherein the adjusted power supply is lower than the active power supply.

28. The computer system of claim 26, wherein the adjusted power supply is higher than the active power supply.

29. The computer system of claim 21, wherein the PCD is in the form of a wireless telephone.

30. The computer system of claim 21, wherein thermal energy generated by processing components in the PCD cannot be managed with a fan component.

31. A computer program product comprising a computer usable device having a computer readable program code embodied therein, said computer readable program code adapted to be executed to implement a method for managing thermal energy generation in a portable computing device ("PCD"), said method comprising:

monitoring one or more temperature sensors in the PCD, wherein each temperature sensor is associated with one of the one or more components and generates signals that represent an instantaneous temperature;

tracking an instantaneous thermal resistance value associated with each of the one or more components, wherein the instantaneous thermal resistance value of a component is calculated from the instantaneous temperature of the component, an active power supply to the component and an ambient temperature of the PCD;

determining that a temperature threshold associated with at least one of the one or more components has been exceeded;

calculating an adjusted power supply for the at least one of the one or more components, wherein the adjusted power supply is calculated from a target temperature of the at least one of the one or more components, the ambient temperature of the PCD and the instantaneous thermal resistance value associated with the at least one of the one or more components; and applying the adjusted power supply to the at least one of the one or more components.

32. The computer program product of claim 31, wherein at least one of the one or more temperature sensors is associated with a silicon junction of a core.

33. The computer program product of claim 31, wherein at least one of the one or more temperature sensors is associated with a package on package ("PoP") memory component.

34. The computer program product of claim 31, wherein the target temperature is lower than the instantaneous temperature.

35. The computer program product of claim 31, wherein the target temperature is higher than the instantaneous temperature.

36. The computer program product of claim 31, wherein applying the adjusted power supply further comprises scaling the voltage and/or frequency of the active power supply.

37. The computer program product of claim 36, wherein the adjusted power supply is lower than the active power supply.

38. The computer program product of claim 36, wherein the adjusted power supply is higher than the active power supply.

39. The computer program product of claim 31, wherein the PCD is in the form of a wireless telephone.

40. The computer program product of claim 31, wherein thermal energy generated by processing components in the PCD cannot be managed with a fan component.

* * * * *